United States Patent
deCarmo

(10) Patent No.: US 6,381,404 B1
(45) Date of Patent: Apr. 30, 2002

(54) MEMORY EFFICIENT METHOD AND APPARATUS FOR READING AND CACHING OF DVD DATA

(75) Inventor: Linden A. deCarmo, Plantation, FL (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/238,759

(22) Filed: Jan. 28, 1999

(51) Int. Cl.[7] .................................................. H04N 5/781
(52) U.S. Cl. ............................ 386/125; 386/46; 386/95
(58) Field of Search ............................... 386/125, 126, 386/46, 45, 95, 109, 111, 112, 33, 98; 703/24; H04N 5/781

(56) References Cited

U.S. PATENT DOCUMENTS 5,335,338 A * 8/1994 Proesel ........................ 703/24
5,999,698 A * 12/1999 Nakai et al. ................. 386/125
6,134,383 A * 10/2000 Kikuchi et al. ............... 386/95
6,181,872 B1 * 1/2001 Yamane et al. .............. 386/112
6,188,835 B1 * 2/2001 Granbois ..................... 386/126

* cited by examiner

Primary Examiner—Vincent F. Boccio
(74) Attorney, Agent, or Firm—Kudirka & Jobse, LLP

(57) ABSTRACT

A multi-block, read-ahead technique permits a DVD player to read and cache DVD data from a DVD source in response to navigation packs (NAV-PCKs) of individual VOBUs to avoid crossing title boundaries, Each VOBU has a NAV-PCK, which specifies the number of blocks in that VOBU. This information can guide the DVD player in performing read-ahead operations aligned to VOBUs, i.e., reading and caching data blocks separately for individual VOBUs. The invention takes advantage of the fact that data blocks within individual VOBUs do not cross title boundaries, and so read-ahead operations aligned to VOBUs avoid reading blocks that cross title boundaries.

9 Claims, 5 Drawing Sheets

MEMORY EFFICIENT METHOD AND APPARATUS FOR READING AND CACHING OF DVD DATA

FIELD OF THE INVENTION

This invention relates generally to improvements in digital versatile disc (DVD) systems and, more particularly, to playback of disc content by such systems. The invention may find application in a variety of other multimedia applications.

BACKGROUND OF THE INVENTION a) Digital Versatile Disc Systems

Digital versatile discs (DVDs) are information storage devices used for storing prerecorded audio information, video and other visual information, and computer software. The storage mechanism used in DVDs closely resembles that used in compact discs (CDs). DVD players also use the same laser technology as CD players. Briefly, both DVDs and CDs store information as a pattern of pits formed in a metallic substrate. The pit patterns form digital words and can be read by shining a laser beam on the disc surface and detecting the reflected beam. The information storage capacity of a typical DVD, however, is much higher than a CD. Presently available DVDs have a variety of capacities which depend on the technology used to manufacture the discs. Single-layer technologies can be either single or double-sided with current capacities of 4.7 gigabytes and 9.4 gigabytes, respectively. Dual layer technologies use single or double sided technologies that currently hold approximately 8.5 gigabytes per side.

DVDs can store information in several formats. DVD-VIDEO discs can store video information (e.g., movies, TV episodes, or music videos) using known information compression algorithms, such as MPEG-2 for video compression/decompression. DVD-ROM discs can store digital data in compressed form for computer use, though the format is usually significantly different from that found on DVD-VIDEO discs.

DVD-VIDEO players are often directed to the consumer market for entertainment use in homes, e.g., for high-resolution, high-fidelity playback of movies or music. DVD-VIDEO players have many CD player features, such as the ability to play selections in any order desired and the ability to read information from any point on the disc. Therefore, DVDs are finding a significant market as a preferred storage and playback system for a wide variety of multimedia.

Information concerning DVD-VIDEO content, discs and players, including (without limitation) data encoding/decoding, data formatting and structures, and navigation and playback, can be had with reference to the "DVD 1.0 *Specification for Read-Only Disc*", Vol. 3 (herein referred to as the "DVD Specification"). The DVD Specification can be obtained, for example, from Toshiba Corp., 1—1 Shibaura 1-Chome, Minato-ku, Tokyo 105-01 Japan.

The data on a DVD-VIDEO disc is organized into a hierarchical set of disc (or physical) data structures, and a corresponding, hierarchical set of presentation (or logical) data structures. The disc data structures contain DVD-VIDEO data arranged in a way closely linked to the physical location and arrangement of the data on the DVD-VIDEO discs. On the other hand, presentation data structures are independent of the physical order of the data on the disc and serve a role of providing navigational information that determines the presentation order of the DVD content. With this versatile arrangement, a DVD-VIDEO disc can contain multiple titles, and/or alternative playback sequences within a title, with the disc's data shared among its different titles and playback sequences.

The multiple types or layers of presentation data structures are given below:
Disc Data Structures
  Video Title Set (VTS)
  Video Object Sets (VOBSs)
  Video Objects (VOBs)
  Cell Objects (cells)

Title is both a memory data structure and logical construct constituting a creative work stored on a DVD-VIDEO disc, such as an individual movie. A DVD-VIDEO title can contain up to 999 program chain objects (PGCs). PGCs can be used to create different versions (camera angles, ratings, outcomes, etc.) of the same title. Each PGC of a DVD-VIDEO links between zero and 99 related program objects, and governs the order in which its programs are to be played. A simple DVD-VIDEO title can contain only one PGC; however, complex titles can contain two or more PGCs to allow user access to and control of a variety of programs (i.e., interactive user control). A multiple-PGCs title can play programs sequentially, randomly (with program repeats), or in shuffle mode (without program repeats). Each program object, for example, a scene of a movie, is an ordered collection of pointers to cells. Individual cells may be used in more than one PGC, different PGCs defining different, alternative sequences through the DVD content. Additionally, a DVD-VIDEO title can have multiple Parts__of__Title (PTTs), each referencing a program object. PTTs are analogous to chapters of a book, and, e.g., can mark different scenes of a movie. PTTs divide a DVD-VIDEO title into a maximum of 99 different parts. Individual PTTs can be part of the same or different PGCS.

The multiple types or layers of presentation data structures are given below:
Presentation Data Structures
  Title
  PTT'(s)
  Program Chain (PGC)
  Program(s) (PGs)
  Cells (pointers)

A video title set (VTS) is essentially analogous to a title and takes the form, on the disc, of a main directory called a VIDEO__TS directory. The VIDEO__TS directory references two types of files distinguished with the file extensions, .IFO and .VOB. A file with the .VOB extension consists of the VOBS data structure, which contains the actual multimedia data in a number of cells. A file with the .IFO extension contain navigational data structures and a processor-independent interpreted language that specifies how the VOBS data structures are arranged and where the associated data are located on the disc. During playback, a DVD-VIDEO player sorts the files on the disc to form a number of video title sets, for example, a number of movies. Each VTS is a grouping of all files on the disc necessary to play a particular title, and is composed of one .IFO file and one or more associated .VOB files containing pointers to a number of individual cells.

The disc structures and presentation structures are linked at the cell level. Each cell specifies, for example, all the video and audio data associated with a group of pictures in the VTS and may span multiple disc blocks. Essentially, a cell constitutes the smallest addressable chunk of data on the DVD-VIDEO disc. A cell is divided into VOBUs, each of which being a container object that includes both multimedia data and playback program commands in an interleaved format. VOBUs, in turn, are broken into packs of packets of compressed bits of video and audio data. Different packs contain data for specifying navigating order (NAV-PCKs) and subpictures, in addition to video (V-PCK) and audio (A-PCK). Each packet on a DVD-VIDEO disc consists of 2048 bytes from a single bitstream, aligned to a disc block.

While a VOBU is playing, the DVD-VIDEO player can obtain input directly from a user by means of controls, such as buttons, which can be displayed under playback program control onscreen along with the multimedia data. For example, user selection of a button can cause the playback program to jump to a new location on the disk and begin playback at the new location, Some DVD content is specifically designed for user-interactive operation, where users can actually change the flow of a video or movie, or change its ending, by user input specifying a different, particular PGC of the title. Such interactive operation results in a change in the order of playback of the individual cells forming the title.

b) Reading and Caching DVD Data During Playback

DVD systems require the ability to transfer large amounts of data from the disc to the playback system. Occasionally, interrupts occur that halt the transfer of data from disc to the system. These interrupts typically are brief and can be provided for by using memory cache techniques. Memory caching is well known in the computer arts as well as in the DVD Specification. A memory caching technique called a "read ahead" operation entails reading and retrieving data prior to the time it needs to be used, and storing the fetched data in a cache, so that the data is available even while further data transfers are halted during interrupt processing. A cache is a fast memory that provides quicker access to stored data than main storage locations provide.

Recently, content on DVD discs is being protected using encryption techniques to prevent copying. For example, the data can be encrypted using the Content Scrambling System (CSS) specified in the DVD Specification. Typically, the player must perform authentication steps or obtain a title key before a number of blocks can be read from the disc. A title key permits the player to read a selected number of titles, e.g., a single title. Unfortunately for read-ahead operations for caching, consecutive blocks on a disc can cross title boundaries. A title key is associated with each block, and entitles the player to read a single title. Because a conventional cache routine is not title-based, it may attempt to read beyond a title boundary and, if so, will fail.

Media-based caching systems using microcode on a DVD-ROM drive system do not have the same problems of reading across blocks over multiple titles since they are, in effect, pre-authorized to do so. Unfortunately, such caching systems typically have expensive non-expandable cache memories, which limits their use in certain DVD applications that require a large cache memory. For example, they are not suitable for DVD-VIDEO players intended for the consumer market, which have cache memories typically limited currently to only 32 or 64 KB.

Alternatively, for read ahead operations, a DVD player may be designed to read only a single block of a disc at a time. Such single block reads are disadvantageous because they generate excess interrupts (i.e., one interrupt per block). The player handles these interrupts with high priority, often preventing other tasks from running while block processing occurs.

Accordingly, it would be desirable to provide a multi-block read-ahead technique that does not read across title boundaries. Preferably, such a technique should be useable in DVD players having limited cache sizes.

SUMMARY OF THE INVENTION

The invention resides in a novel, multi-block, read-ahead technique, in which the DVD player reads and caches DVD data from a DVD source in response to navigation packs (NAV-PCKs) of individual VOBUs to avoid crossing title boundaries. Each VOBU has a NAV-PCK, which specifies the number of blocks in that VOBU. This information can guide the DVD player in performing read-ahead operations aligned to VOBUs, i.e., reading and caching data blocks separately for individual VOBUs. The invention takes advantage of the fact that data blocks within individual VOBUs do not cross title boundaries, and so read-ahead operations aligned to VOBUs avoid reading blocks that cross title boundaries.

More specifically, the read-ahead technique of an embodiment of the invention reads a plurality of blocks of the DVD disc, including a NAV-PCK, and then uses the NAV-PAK to guide future read operations so as to read only blocks of a current VOBU. Then, this process is repeated for other VOBUs of a title. Because only a limited number of blocks are placed in cache during each read-ahead operation, this technique can support a cache of small size, such as that found in current commercial DVD players. The cache can be of any size, however, so long as the cache is not larger than the total number of blocks in any VOBU of a title.

Since a plurality of disc blocks can be processed before generating an interrupt, the processor of the DVD player is free to perform other tasks, such as processing user interactions. This technique therefore results in faster read-ahead operations. For example, where the DVD player can perform 31 blocks reads, it is capable of running 31 times faster than a DVD player capable of only a single-block read.

BRIEF DESCRIPTION OF THE DRAWINGS

The above and other features, objects and advantages of the invention will be better understood by referring to the following detailed description in conjunction with the accompanying drawing in which.

DETAILED DESCRIPTION OF A PREFERRED EMBODIMENT

Figure 1:
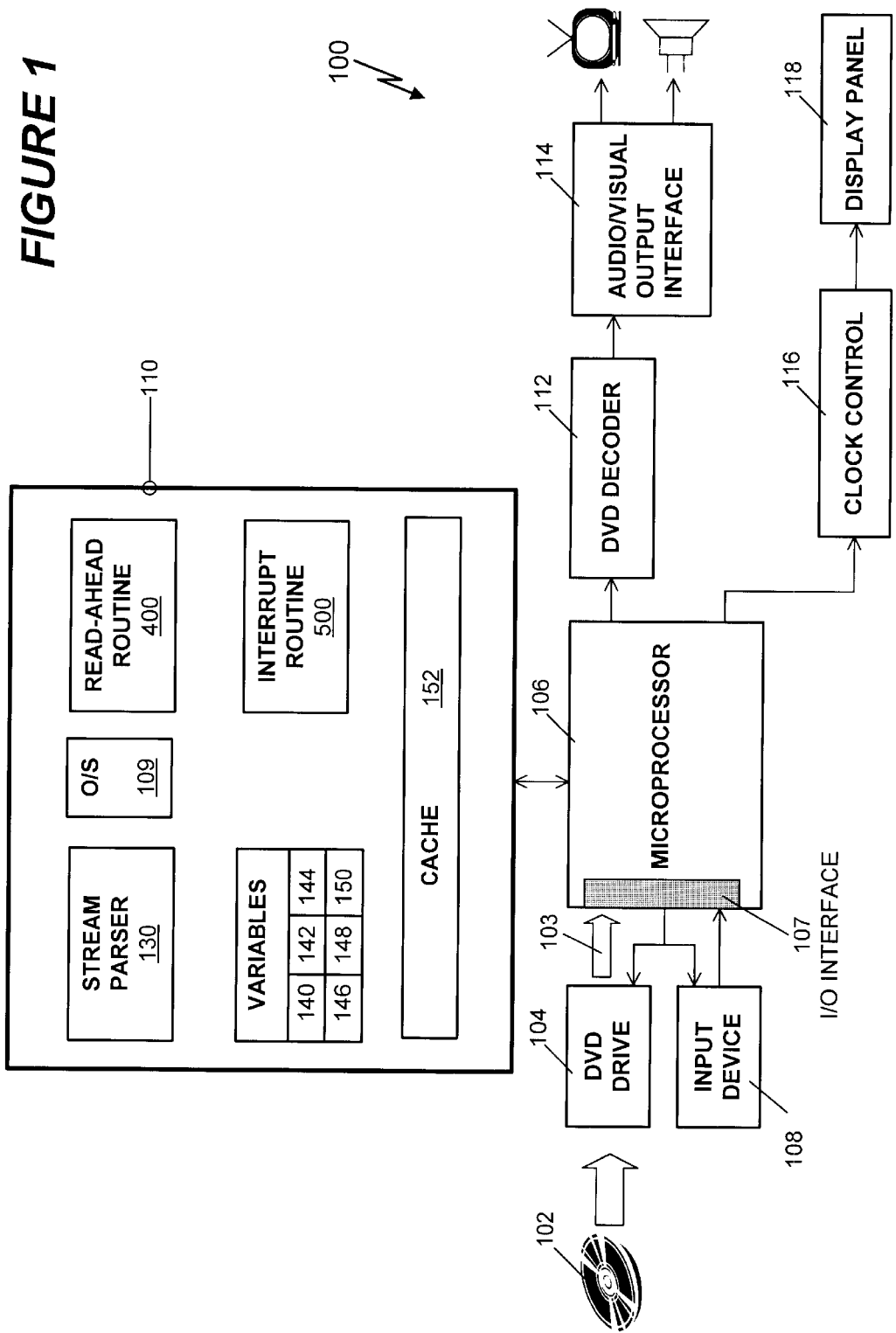
FIG. 1 is a block diagram of a DVD player in accordance with an embodiment of the invention.

FIG. 1 shows a DVD-VIDEO player 100 for playing back a pre-recorded DVD-VIDEO disc 102 to present an audio and/or visual output to users. As illustrated, the DVD-VIDEO system 100 has a conventional DVD-VIDEO disc reader or drive 104 for reading information from the DVDs 102, which has been compressed and encoded in accordance with the DVD Specification. While not shown, those skilled in the art will appreciate that the DVD drive 104 has, for example, an optical pick-up and a disc motor, both under the control of a servo processor or controller. The DVD-VIDEO drive 104 passes a DVD bitstream 10 to a microprocessor 108, which can also receive other input from an input device 108, such as a keyboard. The use of the DVD-VIDEO drive 104 should not be construed as a limitation; other conventional DVD sources could also provide the DVD bitstream 103, such as the Internet, digital satellite dishes, etc.

The microprocessor 106 has an input/output interface 107, such as a driver program, which enables its memory-resident operating system 109 to control and exchange information with the servo-processor of the DVD-VIDEO disc drive 104. The microprocessor 106 processes the DVD bitstream 103 read from the disc pursuant to certain DVD computer programs, described below, stored in a memory system 110.

The DVD content in the bitstream is provided to a DVD decoder 112, which decodes the DVD content and provides the resulting audio and/or visual information to an audiovisual output interface 114, for presentation to users, for example, by a TV monitor and/or a speaker. The microprocessor 106 also passes a clock control signal, generated from timing information contained in the DVD bitstream 103, to a clock control module 116. The clock control module 116 controls a display panel 118 for display of a count indicating the portion played of the current DVD-VIDEO title.

The processing of the DVD bitstream 103 by the microprocessor 106 will now be described in greater detail. During processing, the microprocessor 106 executes a stream parser program 130 fetched from the memory system 110, which operates on the DVD bitstream 103. As noted above, the DVD bitstream 103 can include content data, formatting data and navigation data. The stream parser program 130 is initialized when the DVD player system 100 commences operation. During operation, the stream parser 130 causes the DVD content data to be transferred to the DVD decoder 112, where the content data is decompressed and decoded in a conventional manner. The stream parser program 130 also causes the navigation data and formatting data to be processed, and commands included therein to be executed. Further information regarding a suitable stream parser for DVD players can be had with reference to a co-pending, commonly-assigned U.S. patent application, Ser. No. 09/014,480, entitled "DVD Navigation System with Multiple Independent Threads," filed by Linden A. DeCarmo and Amir M. Mobini. (The disclosure of that application is incorporated herein by reference.) In the present invention, however, the stream parser program 130 calls certain special routines, described below, for read-ahead operation and caching of DVD data read from the disc.

The DVD player loads data fetched during a read-ahead operation into a cache 150 of memory 120 prior to its processing and/or decoding. Memory caching is well known in the computer arts as well as in the DVD Specification. The fetched data can be stored in the cache 150 until it is needed. Read-ahead operations are useful in that they are designed to maintain sufficient data in the cache to enable playback to continue uninterrupted even while the microprocessor is servicing interrupts. Unfortunately, conventional read-ahead operations can be limited or prevented altogether due copy-protection techniques. As described above, such techniques can prevent conventional read-ahead techniques from reading data blocks that cross title boundaries into titles that the DVD player is not authorized to play. Further information regarding caches for DVD players and problems associated with copy protected content can be had with reference to a co-pending, commonly-assigned U.S. Pat. application, Ser. No. 09/122,967, entitled "A Host-Based Caching Method and System for Copy Protected Content," filed by Linden A. DeCarmo. (The disclosure of that application is incorporated herein by reference.) The invention pertains to a novel technique for performing read-ahead operations and storing data in the cache of the DVD player, particularly where, e.g., title keys possessed by the player will not permit read-ahead operations to cross title boundaries.

Figure 2:
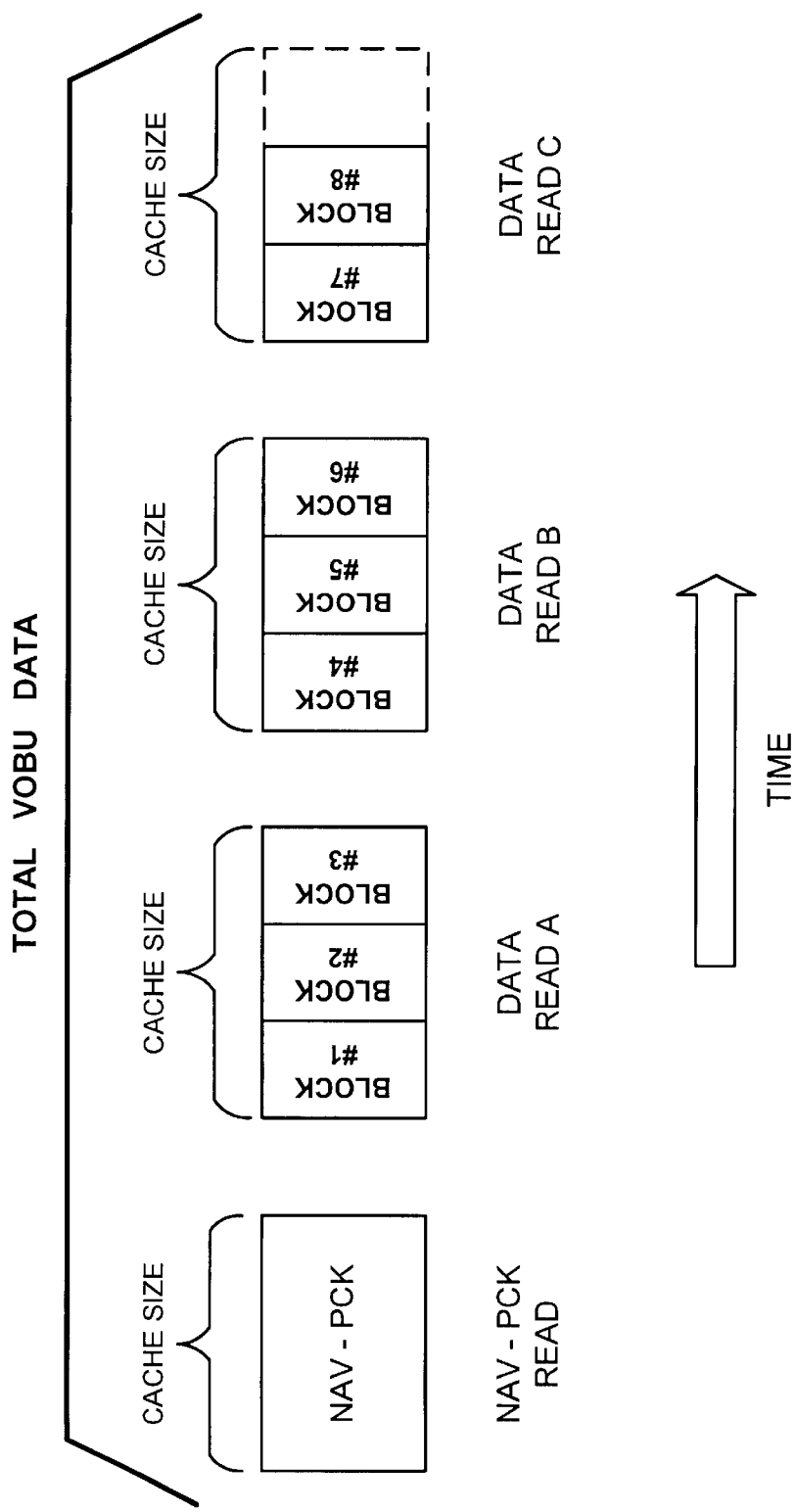
FIG. 2 is a conceptual diagram of DVD data reads and caching in accordance with the embodiment of FIG. 1.

FIG. 2 illustrates the invention's principles with reference to a cache size of three blocks. In this example, a VOBU has nine total blocks (including the NAV-PCK). In an exemplary embodiment of the invention, the NAV-PCK block is read first in a NAV-PCK READ. Then, three data blocks constituting a full cache are read twice, i.e, blocks nos. 1–3 and nos. 4–6, respectively in DATA READ A and DATA READ B. A final read of the DVD data, indicated at DATA READ C, cannot fill the cache because only two blocks are available. Consequently, READ C consists of those two blocks being read, i.e., block nos. 7–8, with a single block (shown in phantom) of the cache not being used. Thus, guided by the NAV-PCK, multi-section reads can be made without risking an inter-title boundary.

Figure 3:
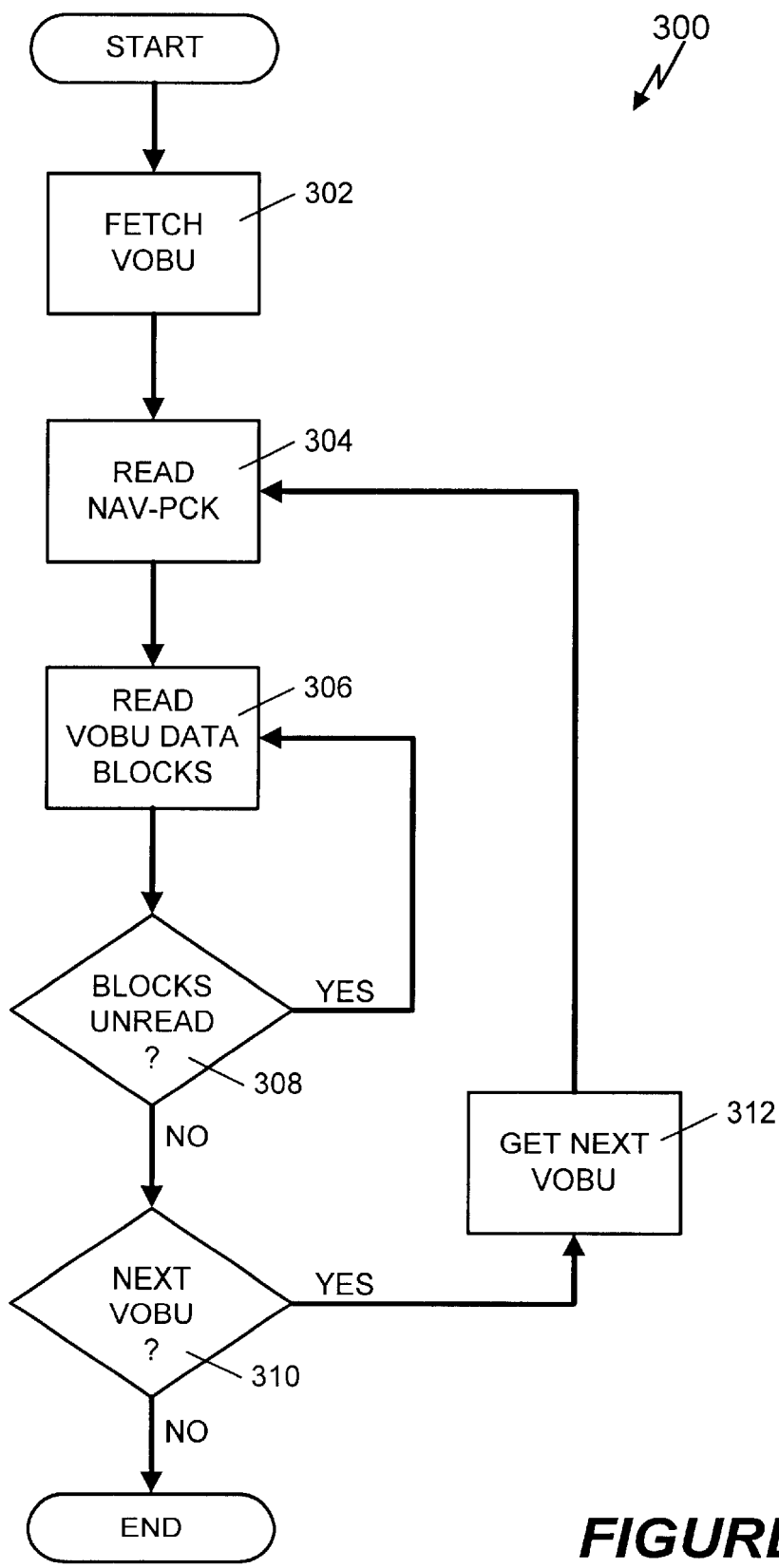
FIG. 3 is a block diagram depicting a method for reading and caching DVD data during playback in accordance with the embodiment of FIG. 1.

FIG. 3 shows a method 300 for reading and caching DVD data according to an embodiment of the invention. The method 300 starts in step 302 with a VOBU being fetched. Step 304 reads the NAV-PCK block of the fetched VOBU. This block contains information specifying the total number of blocks in the VOBU, including the NAV-PCK. Step 306 reads a number of blocks of data from the VOBU, preferably the maximum number of blocks that the cache can hold. Method 300 repeat the foregoing step 306 as long as there is remaining data in the VOBU. More particularly, step 308 tests whether there are any data blocks in the VOBU not read. If there are, step 306 is repeated, i.e., a number of remaining VOBU blocks are read, the number of blocks read being equal to the cache size until a number less than the cache size remains in the VOBU, and then those remaining blocks are read. Afterwards, step 310 tests whether there are any other VOBUs in the title not read and, if there are, step 312 gets a next VOBU and method 300 returns to step 304 to process that VOBU. If there are no more VOBU in the title left unprocessed, method 300 is finished.

Figure 4:
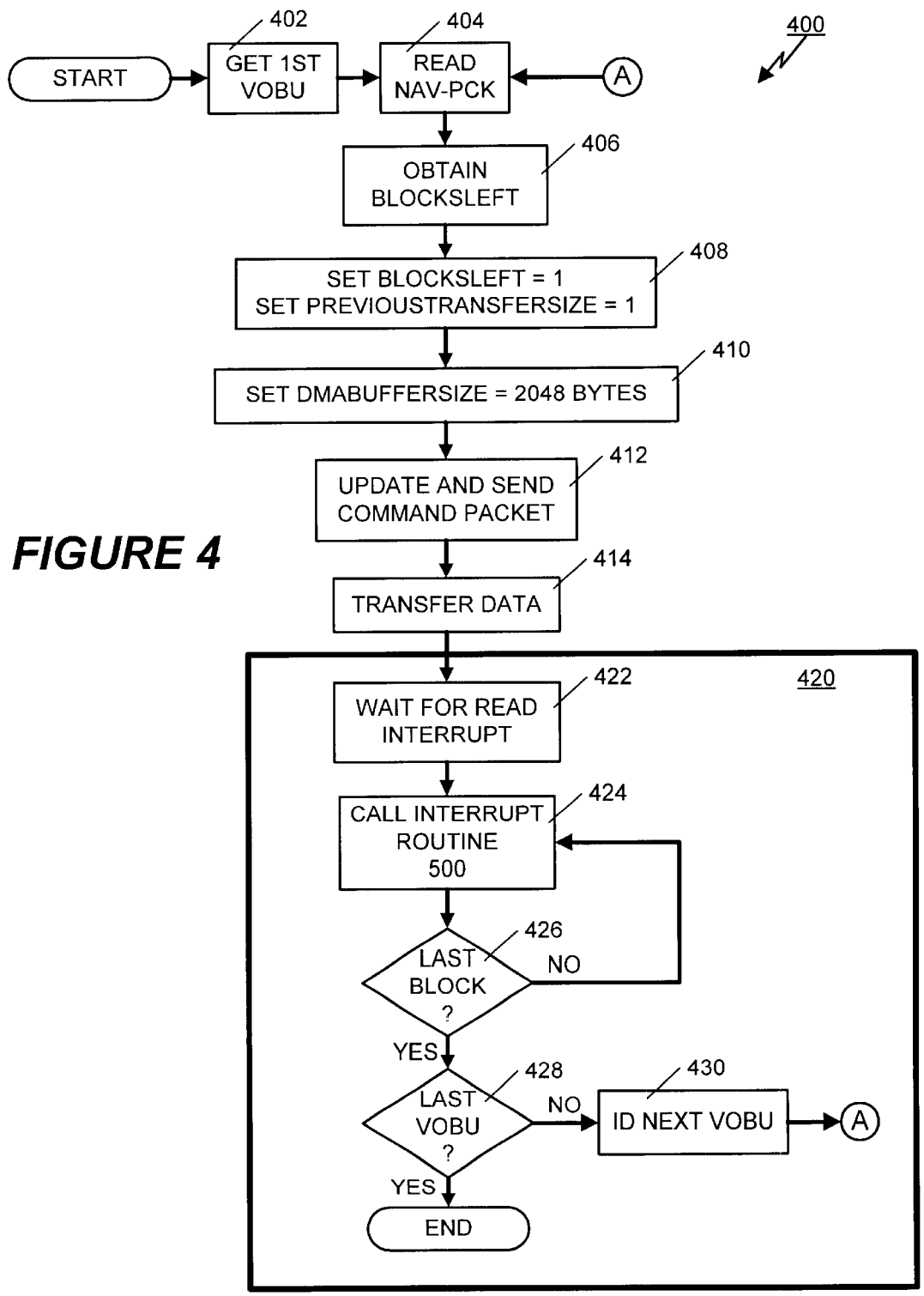
FIG. 4 is a block diagram depicting a read-ahead routine implementing the method of FIG. 3.

FIG. 4 shows, in more-detail, the method 300 implemented as a computer-executable read-ahead routine 400 for reading and caching DVD data in accordance with an embodiment of the invention. For routine 400, the DVD-VIDEO player 100 maintains in memory system 110 a number of data structures, pointers and flags used in transferring and caching DVD data. These include the following:

LogicalBlockAddress (LEA) 140: Logical block size to read.

PreviousTransferSize (PTS) 142: Size in blocks of the previous transfer.

BlocksToTransfer (BTT) 144: size in blocks all the current transfer.

CacheSize (CS) 146: maximum number of blocks which the cache can hold.

DMABufferSize (DBS) 148: size of data to be transferred to the decoder.

BlocksLeft (BL) 150: amount of blocks in the VOBU left to read.

The routine 400 starts in step 402 by getting a first VOBU. Step 404 reads the NAV-PCK block of the fetched VOBU. Step 406 obtains BLOCKSLEFT information from the NAV-PCK. Step 408 sets BLOCKSTOTRANSFER=1 and PREVIOUSTRANSFERSIZE=1, i.e., sets both the size of the current transfer and the size of the previous transfer to a single block of DVD data. The first block is the NAV-PAK, so this step causes the NAV-PAK to be read. The NAV-PAK contains information indicating the block size for subsequent transfers. Step 410 sets DMABUFFERSIZE equal to the size of a block, usually 2048 bytes. Step 412 updates a command packet with the value of DMABUFFERSIZE and sends the command packet through the I/O interface to the DVD reader, resulting in, at step 414, a transfer of a single block of data in response to the command packet.

The foregoing paragraph describes the first transfer of data in a VOBU. With that completed, routine 400 proceeds to a routine 420 for reading and caching subsequent blocks of the VOBU. Routine 420 starts with step 422, whereat routine 400 waits for a read interrupt to signify that the DVD player 100 is ready to process additional DVD content. Step 424 calls an Interrupt routine 400 (FIG. 4) to read and cache sequentially additional blocks of a current VOBU. Step 426 tests whether the last block of the current VOBU has been read. If it has not been read, routine 420 returns to step 422 to wait for another read interrupt. Otherwise, if the last block of the current VOBU has been read, the routine 400 continues at step 428 to test whether the title has any more VOBU. If it does, in step 430, on the next read interrupt, the routine 400 identifies a next VOBU to be read and processed, starting at step 404. Otherwise, if there are no more VOBU left unprocessed, the routine 400 ends.

Figure 5:
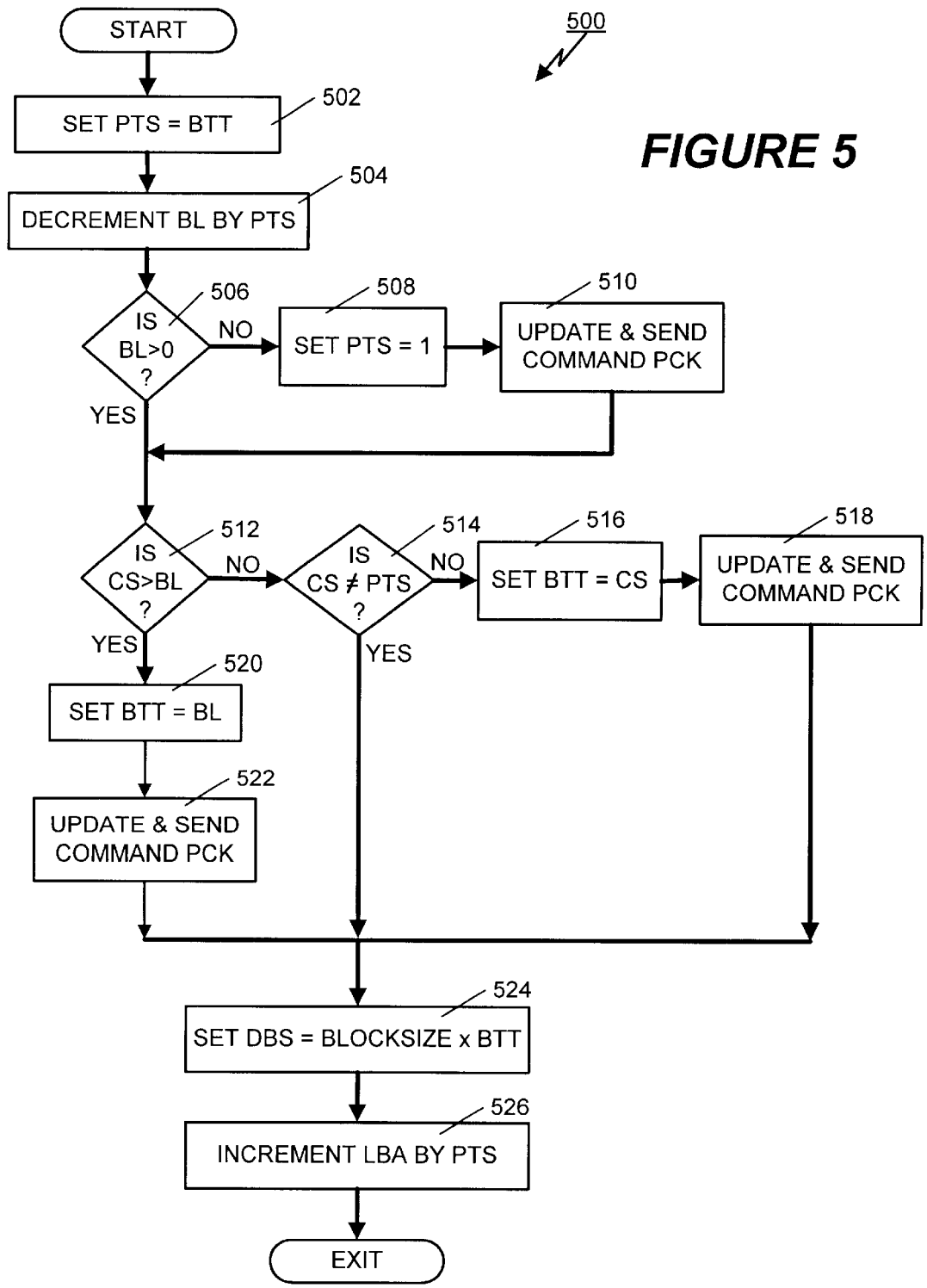
FIG. 5 is a block diagram of the Interrupt routine of the read-ahead routine of FIG. 4.

More particularly, FIG. 5 shows one embodiment of the Interrupt Routine 500, callable by routine 400. The Interrupt Routine 500 is responsible for reading and caching all blocks subsequent to the first block of a particular VOBU. Step 502 sets PREVIOUSTRANSFERSIZE equal to BLOCKSTOTRANSFER, i.e., the block size of the current transfer to the block size of the previous transfer. Step 504 decrements BLOCKSLEFT by PREVIOUSTRANSFERSIZE, i.e., reduces the specifier of the number of blocks in the VOBU left to read by the number in the previous transfer. Step 506 test whether BLOCKSLEFT is greater than zero. If it is not, then there are no blocks in the VOBU left to be read. Consequently, step 508 sets PREVIOUSTRANSFERSIZE equal to 1, step 510 updates the command packet and sends it to the drive to cause a transfer of the first block of a next VOBU. If step 506 determines that BLOCKSLEFT is greater than zero so as to indicate remaining unread blocks in the current VOBU, routine 500 continues at step 512 by testing whether CACHESIZE is greater than BLOCKSLEFT. If not, the block size of the cache is either equal to or less than the blocks remaining unread. Then, step 514 tests whether CACHESIZE is not equal to PREVIOUSTRANSFERSIZE, i.e., whether the cache is smaller than the number of blocks transferred in the previous read operation. If so, the cache size is smaller than the blocks left unread in the VOBU, and so step 516 sets BLOCKSTOTRANSFER equal to CACHESIZE, and step 518 updates a command packet and sends it to the drive to cause a transfer of the specified number of blocks. If the test of step 512 determines that CACHESIZE is greater than BLOCKSLEFT, step 520 sets BLOCKSTOTRANSFER equal to BLOCKSLEFT, and step 522 updates a command packet and sends it to the drive to cause a transfer of the remaining blocks of the VOBU. Routine 500 proceeds to step 524 after steps 516, step 518, or if the test of step 518 determines that CACHESIZE is not equal to the PREVIOUSTRANSFERSIZE. Step 524 sets DMABUFFERSIZE equal to the product of the size of a block (e.g., 2048 bytes) and BLOCKSTOTRANSFER, i.e., sets the size of the data to be transferred to the decoder, e.g., to 2048 bytes times the block size of the current transfer. Step 526 increments LOGICALBLOCKADDRESS by PREVIOUSTRANSFERSIZE, and, finally, step 528 exits the Interrupt routine 400.

Accordingly, routines 400 and 500 provide a novel, multi-block, read-ahead technique, in which the DVD player uses information contained in the navigation pack (NAV-PCK) block of each VOBU in the DVD bitstream from a DVD source so as to perform multi-block reads, and to cache read data, only within a single VOBU, thus avoiding reading blocks that cross title boundaries. Since a plurality of blocks are processed before generating an interrupt, the processor of the DVD player is free to perform other tasks, such as processing user interactions. This technique therefore results in faster read-ahead operations without risking failure due to copy protection violations.

In the illustrative embodiment described above, the computer executable programs of DVD player 100 can be implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

A software implementation of the above described embodiment(s) may have a series of computer-executable instructions either fixed on a tangible medium (such as a computer readable media, e.g. diskette, CD-ROM, ROM, or fixed disc) or transmittable to a computer system (via a modem or other interface device, such as communications adapter 190 connected to a network over a medium). The medium can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be (a) distributed as a removable media with accompanying printed or electronic documentation (e.g., shrink wrapped software), (b) preloaded with a computer system, e.g., on system ROM or fixed disc, or (c) distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved either in all software implementations (using the appropriate object or processor instructions), or in hybrid implementations (using a combination of hardware logic, software logic and/or firmware to achieve the same results). The specific configuration of logic and/or instructions utilized to achieve a particular function, as well as other modifications to the implementations of the inventive are intended to be covered by the appended claims.

What is claimed is:

1. A digital versatile disc (DVD) method for multi-block, read-ahead operations in which a DVD player reads and caches data of a DVD bitstream from a DVD source, the DVD player including a cache capable of holding a number (N2) of data blocks, the method comprising:

A) fetching a navigation pack (NAV-PCK) from a DVD disc;

B) processing information contained in the NAV-PCK block of a VOBU in the DVD bitstream, the VOBU including a number (N1) of blocks of data in addition to the NAV-PCK, and extracting from the NAV-PCK information specifying the number (N1) of data blocks in the VOBU;

C) in response to the NAV-PCK information, performing a plurality of read operations with respect to data located in more than one block of the DVD disc, the read operation comprising:

C1) reading only data within a single VOBU and within a single DVD title,

C2) reading a plurality of the data blocks of the VOBU from the DVD disc, the read data blocks being less in number than the total number (N1) of data blocks in the VOBU and not greater than the number (N2) of data blocks that the cache can hold; and C3) repeating step (02) until all N1 blocks of the VOBU have been read; and D) placing the read data in a cache.

2. The method in accordance with claim 1, further including the steps of repeating the steps of the method separately for each VOBU of a title.

3. The method in accordance with claim 1, further including the step of providing the DVD bitstream by reading a DVD disc.

4. The method in accordance with claim 3, wherein the interrupt routine invoking step comprises the step of reading and caching all blocks subsequent to the first block of a particular VOBU by performing the steps comprising:

A) setting PREVIOUSTRANSFERSIZE equal to BLOCKSTOTRANSFER;

B) decrementing BLOCKSLEFT by PREVIOUSTRANSFERSIZE;

C) testing whether BLOCKSLEFT is greater than zero;

D) if BLOCKSLEFT is not greater than zero, setting PREVIOUSTRANSFERSIZE equal to one, and updating the command packet to reflect said step (D) and sending the command packet;

E) after step (D), or if BLOCKSLEFT is greater than zero, testing whether CACHESIZE is greater than BLOCKSLEFT, and if it is not, testing whether CACHESIZE is not equal to PREVIOUSTRANSFERSIZE;

F) if CACHESIZE and PRPVIOUSTRANSFPRSIZE are not unequal, setting BLOCKSTOTRANSFER equal to CACHESIZE, and updating a command packet to reflect said step (F) and sending the command packet;

G) if CACHESIZE is not greater than BLOCKSLEFT, setting BLOCKSTOTRANSFER equal to BLOCKSLEFT, and updating a command packet to reflect said step (G) and sending the command packet;

H) after step (G), after step (F), or if CACHESIZE is unequal to PREVIOUSTRANSFERSIZE, setting DMABUFFERSIZE equal to a product of the size of a block and BLOCKSTOTRANSFER; and I) incrementing LOGICALBLOCKADDRESS by PREVIOUSTRANSFERSIZE.

5. A method for reading and caching DVD data from a DVD source, said method comprising the steps of:

A) getting a first VOBU;

B) reading the NAV-PCK block of the fetched VOBU to obtain BLOCKSGLEFT information from the NAV-PCK;

C) setting BLOCKSTOTRANSFER equal to one and PREVIOUSTRANSFERSIZE equal to one;

D) setting DMABUFFERSIZE equal to the size of a block;

E) updating a command packet and sending the command packet to the DVD drive;

F) the DVD drive making a first transfer of data from the DVD disc comprising a plurality of blocks of the VOBU in an amount specified and from a location specified by the command packet; and G) making subsequent transfers of data comprising subsequent blocks of the VOBU, by performing the steps comprising:

i) waiting for a read interrupt to signify that the DVD player is ready to process additional DVD data;

ii) invoking an interrupt routine to read and cache a selected number of subsequent VOBU blocks; and iii) testing whether a last block of the VOBU has been read, and if the last block has not been read returning to step (G) (i) to wait for another read interrupt, and otherwise, if the last block of the VOBU has been read, and in response to a next read interrupt, reading a next VOBU.

6. A digital versatile disc (DVD) apparatus for multi-block, read-ahead operations, in which a DVD player reads and caches data of a DVD bitstream from a DVD source, said apparatus comprising:

A) a processor for processing information contained in a navigation pack (NAV-PCK) block of a VOBU in the DVD bitstream, the VOBU includes a number (N1) of blocks of data in addition to the NAV-PCK, the processor capable of fetching the NAV-PCK from the DVD source, and extracting from the NAV-PCK information specifying the number (N1) of data blocks in the VOBU;

B) a mechanism, responsive to the NAV-PCK information, for performing a plurality of read operations with respect to data located in more than one block of the disc including reading only data within a single VOBU, the mechanism being further responsive to the specified number for sequentially reading a plurality of the data blocks of the VOBU from the DVD source, the read data blocks being less in number than the total number (N1) of data blocks in the VOBU and not greater than a number (N2) of data blocks that a cache can hold, and C) a cache for holding the read data.

7. The apparatus in accordance with claim 6, wherein the mechanism separately fetches data blocks for each VOBU of a title.

8. A digital versatile disc (DVD) computer program product for multi-block, read-ahead operations, which enables a DVD player to read and cache data of a DVD bitstream from a DVD source, said computer program product comprising:

A) a medium for storage;

B) first computer executable program code stored on the storage medium for processing information contained in a navigation pack (NAV-PCK) block of a VOBU in the DVD bitstream, the first computer program code can fetch the NAV-PCK from the DVD source, and extract from the NAV-PCK information specifying the number (N1) of data blocks in the VOBU;

C) second computer executable program code stored on the storage medium, responsive to the NAV-PCK information, for performing a plurality of read operations with respect to data located in more than one block of the disc and only within a single VOBU of a title, the second computer program code being responsive to the specified number (N1) for sequentially reading a plurality of the data blocks of the VOBU from the DVD source, the read data blocks being less in number than the total number (N1) of data blocks in the VOBU and not greater than a number (N2) of data blocks that a cache can hold; and D) third computer executable program code stored on the storage medium for causing a cache to hold the read data.

9. The computer program product in accordance with claim 8 wherein the second computer program code separately fetches data blocks for each VOBU of a title.

* * * * *

UNITED STATES PATENT AND TRADEMARK OFFICE
CERTIFICATE OF CORRECTION

PATENT NO.    : 6,381,404 B1
DATED         : April 30, 2002
INVENTOR(S)   : Linden A. deCarmo It is certified that error appears in the above-identified patent and that said Letters Patent is hereby corrected as shown below:

Column 9,
Line 36, replace "repeating step (O2)" with -- repeating step (C2)--;
Line 64, replace "PRPVIOUSTRANSFPRSIZE" with -- PREVIOUSTRANSFERSIZE --; and Column 10,
Line 15, replace "BLOCKSGLEFT" with -- BLOCKSLEFT --;

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,381,404 B1  
DATED : April 30, 2002  
INVENTOR(S) : Linden A. deCarmo It is certified that error appears in the above-identified patent and that said Letters Patent is hereby corrected as shown below:

Column 9,  
Line 36, replace "repeating step (O2)" with -- repeating step (C2) --;  
Line 64, replace "PRPVIOUSTRANSFPRSIZE" with  
-- PREVIOUSTRANSFERSIZE --; and Column 10,  
Line 15, replace "BLOCKSGLEFT" with -- BLOCKSLEFT --;

Signed and Sealed this

Twenty-ninth Day of October, 2002

Attest:

Attesting Officer

JAMES E. ROGAN  
*Director of the United States Patent and Trademark Office*